(12) United States Patent
Ponx

(10) Patent No.: US 6,667,878 B2
(45) Date of Patent: Dec. 23, 2003

(54) DOUBLE SCREEN LAPTOP

(76) Inventor: David A. Ponx, 14 Destino Pl., Pueblo, CO (US) 81005

( * ) Notice: Subject to any disclaimer, the term of this patent is extended or adjusted under 35 U.S.C. 154(b) by 0 days.

(21) Appl. No.: 10/058,754

(22) Filed: Jan. 30, 2002

(65) Prior Publication Data

US 2003/0142469 A1 Jul. 31, 2003

(51) Int. Cl.[7] .................................................. G06F 1/16
(52) U.S. Cl. ........................ 361/683; 361/679; 361/686
(58) Field of Search ................................ 361/679–683, 361/686

(56) References Cited

U.S. PATENT DOCUMENTS

| | | | |
|---|---|---|---|
| 5,673,170 A | 9/1997 | Register | |
| 5,687,939 A | 11/1997 | Moscovitch | |
| 5,768,096 A | 6/1998 | Williams et al. | |
| 5,796,577 A | 8/1998 | Ouchi et al. | |
| 5,900,848 A | 5/1999 | Haneda et al. | |
| 6,094,341 A | 7/2000 | Lin | |
| 6,266,241 B1 | 7/2001 | Van Brocklin et al. | |
| 6,532,146 B1 * | 3/2003 | Duquette | 361/681 |

* cited by examiner

*Primary Examiner*—Darren Schuberg
*Assistant Examiner*—Yean Hsi Chang
(74) *Attorney, Agent, or Firm*—Richard C. Litman

(57) ABSTRACT

The instant invention is a laptop or notebook computer which employs first and second display screens coupled electronically to display identical images at the same time. The dual screen capability is ideal for business presentations, instruction and other like uses. The two screens are mechanically coupled to each other and to the computer in a manner which allows the three elements to be collapsed into a compact unit. A cover is provided to protect the second screen. The cover functions as the top of the computer when the unit is collapsed. The cover may be hinged to the second screen or may be designed to slide off.

10 Claims, 6 Drawing Sheets

DOUBLE SCREEN LAPTOP

BACKGROUND OF THE INVENTION

1. Field of the Invention

The present invention generally relates to display systems. More specifically, the present invention is drawn to a notebook computer having dual display screens.

2. Description of the Related Art

Most personal computers (PCs) of the notebook size employ a single, flat screen to display graphics and/or data thereon. The single screen is adequate if only the person at the computer keyboard is viewing. However, there are many instances (business conferences, instruction, etc.) where it is necessary that the screen must be viewed by more than one person. In such instances the additional person(s) must watch the single screen from behind and over the head of the person at the keyboard or must assume a position at the side and view the screen from an angle. Either scenario would prevent the additional person(s) from having a clear, undistorted view of the screen. A reliable, compact, protected, multi-screen notebook computer would certainly be a welcome addition to the art.

There are computers in the prior art which employ dual screens. For example, U.S. Pat. No. 5,796,577 (Ouchi et al.), U.S. Pat. Nos. 5,900,848 (Haneda et al.) and 6,094,341 (Lin) disclose notebook computers with duel screens. It is noted that none of the patentees contemplate providing a protective cover for the secondary screen except protection which might be afforded by the lid of a cumbersome carrying case.

U.S. Pat. No. 6,266,241 B1 (Van Brocklin et al.) is drawn to a notebook computer wherein the height of the display may be adjusted for ergonomic considerations. There is no disclosure related to a duel screen and a protective cover therefor.

U.S. Pat. No. 5,768,096 (Williams et al.) shows display panels which move into and out of a viewing position. The panels of the patent form a concatenated display screen when in they viewing position rather than an opposed display as contemplated in the instant invention.

U.S. Pat. No. 5,687,939 (Moscovitch) discloses a duel display system supported on an arm, which arm functions to move the displays in vertical or horizontal registration. There is no provision for incorporating the duel displays in a notebook computer or in providing a protective cover for one of the display screens.

U.S. Pat. No. 5,673,170 (Register) is drawn to a secondary display adapted to be mounted to the monitor of a desktop computer. The patentee does not contemplate a protective cover for the secondary display.

None of the above inventions and patents, taken either singularly or in combination, is seen to disclose a double screen notebook computer having a protective cover for the secondary screen as will subsequently be described and claimed in the instant invention.

SUMMARY OF THE INVENTION

The instant invention, to be dubbed the "A-Screen", is a laptop or notebook computer which employs first and second display screens coupled electronically to display identical images at the same time. The dual screen capability is ideal for business presentations, instruction and other like uses. In a preferred embodiment, the two screens are mechanically coupled to each other and to the computer in a manner which allows the three elements to be collapsed into a compact unit. A cover is provided to protect the second screen. The cover functions as the top of the computer when the unit is collapsed. The cover may be hinged to the second screen or may be designed to slide off. An adjustable leg is disposed at the bottom of the second screen to compensate for difference in height between the second screen and the computer keyboard when the unit is in use.

Accordingly, it is a principal object of the invention to provide a notebook computer having a dual display, which duel display is arranged to be viewed from opposite directions.

It is another object of the invention to provide a notebook computer having a dual display, wherein the second screen of the display is equipped with a removable cover.

It is a further object of the invention to provide a notebook computer having a dual display, wherein the screens of the dual display and the cover are connected for easy collapsing.

Still another object of the invention is to provide a notebook computer wherein a second screen and cover may be easily retrofitted to a conventional notebook computer.

It is an object of the invention to provide improved elements and arrangements thereof for the purposes described which are inexpensive, dependable and fully effective in accomplishing their intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
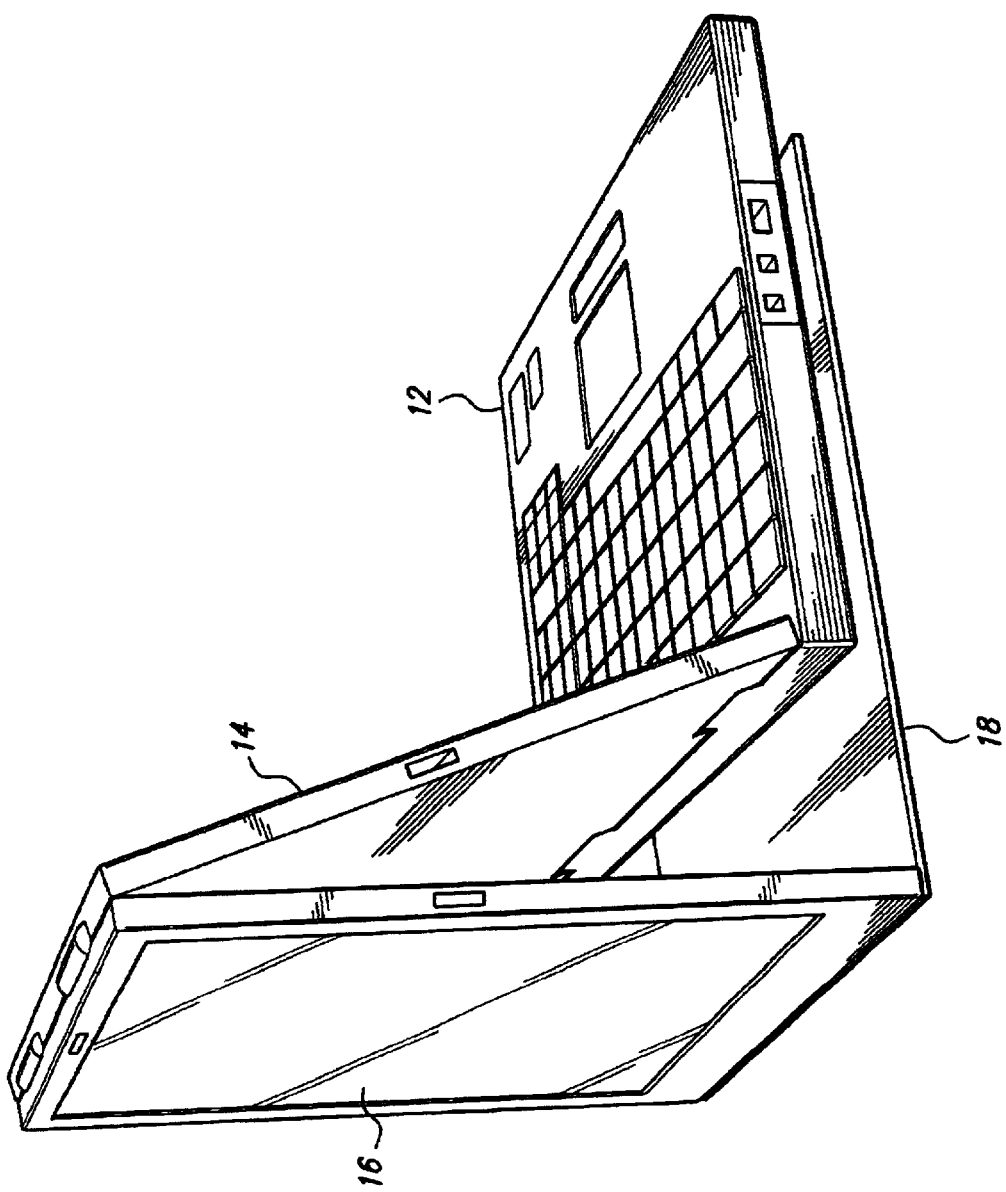
FIG. 1 is an environmental, perspective view of a duel screen notebook computer according to the present invention.
Figure 2:
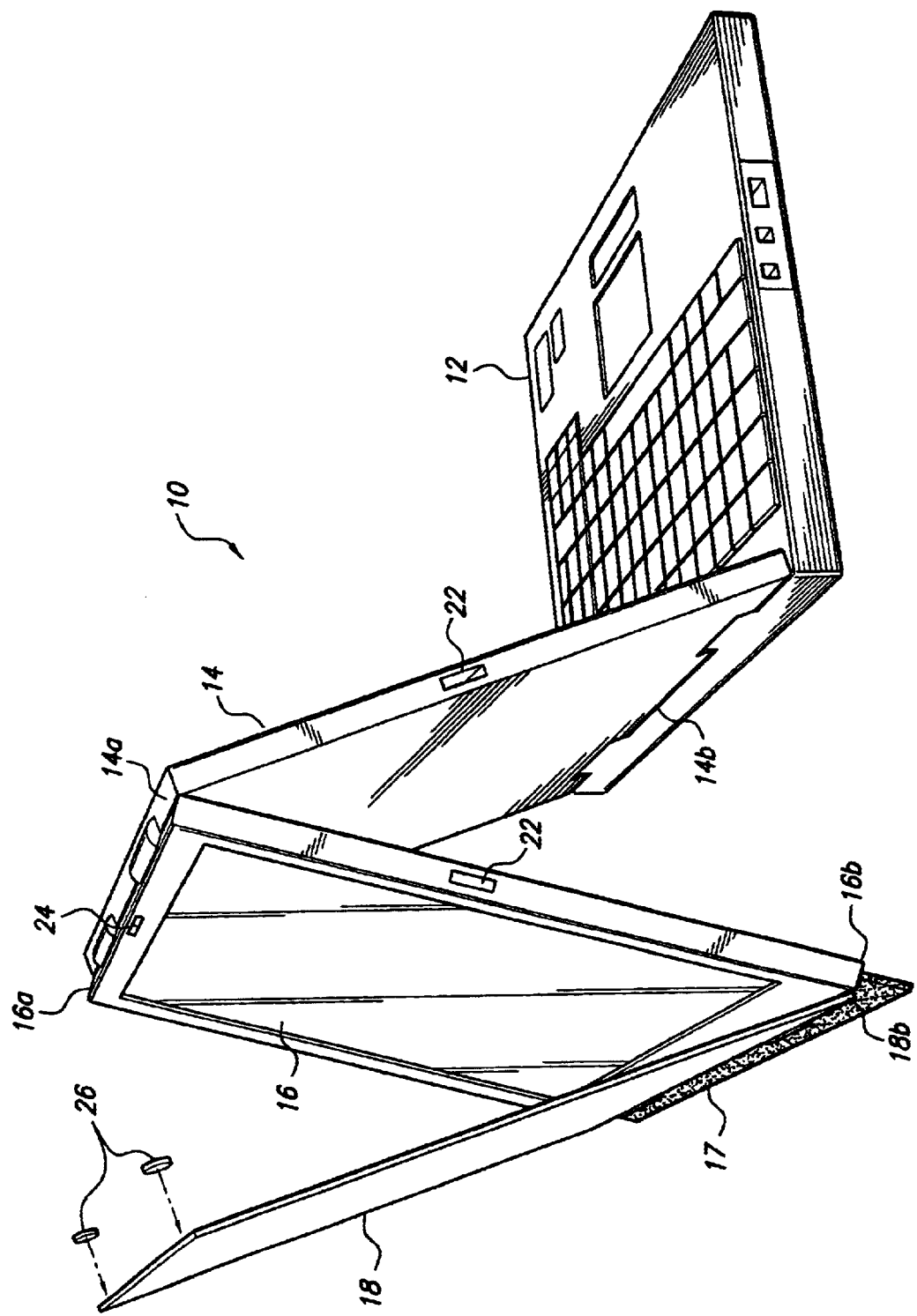
FIG. 2 is a perspective view of a duel screen notebook computer with a protective cover in a partially open position according to the present invention.
Figure 3:
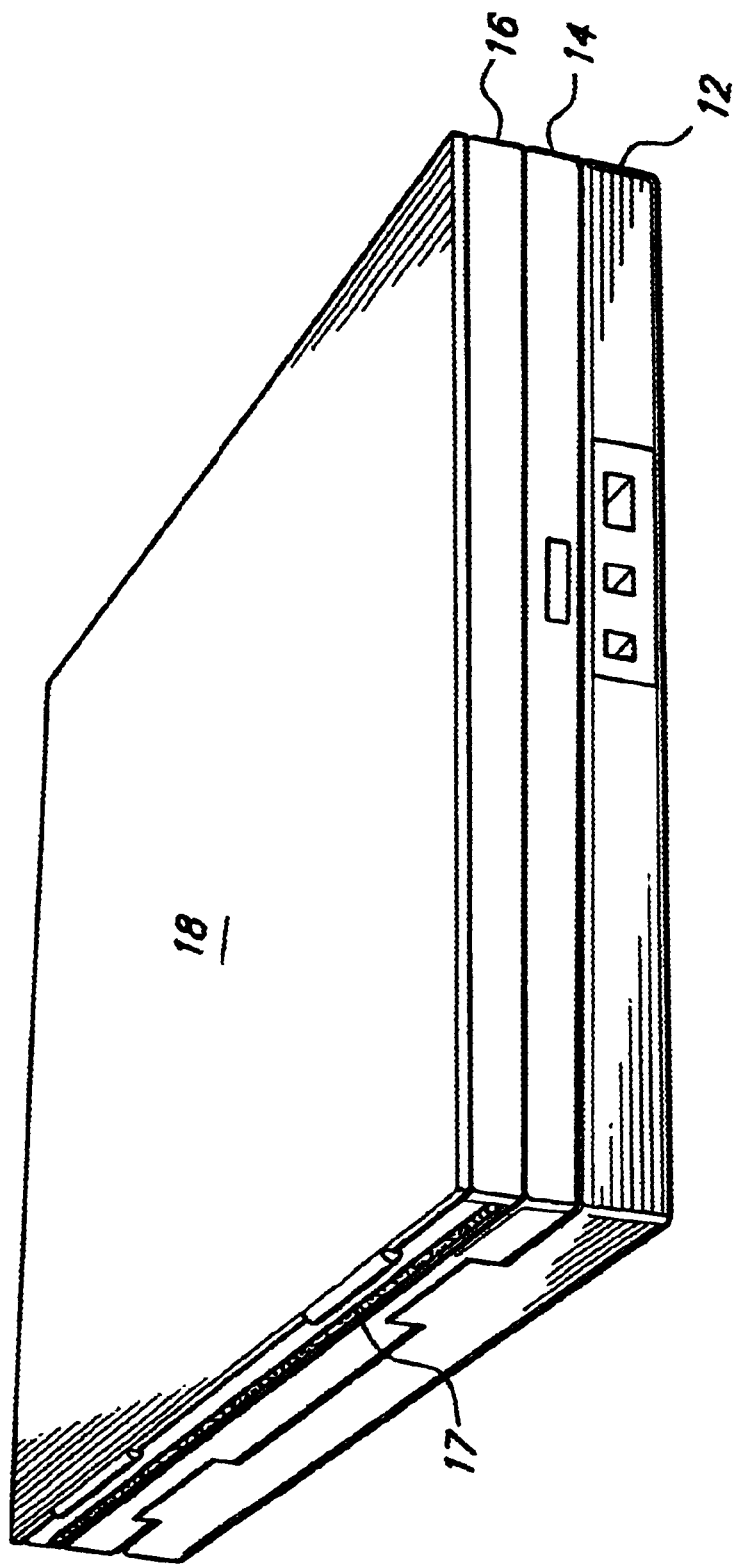
FIG. 3 is a perspective view of a duel screen notebook computer in a completely closed position according to the present invention.

Attention is first directed to FIGS. 1–3 wherein the notebook computer of the instant invention is indicated generally at 10. The computer comprises a standard keyboard 12 and a primary viewing screen 14, which screen is hinged at its bottom 14b to the top of keyboard 12 in a conventional manner. A secondary screen 16 has a top edge 16a hinged to the top edge 14a of screen 14. A screen cover member 18 is hinged at a bottom edge 18b to the bottom edge 16b of secondary screen 16. The hinged arrangement is such that the keyboard, two screens and cover may be collapsed from the fully open position as shown in FIG. 1 to a completely closed position as shown in FIG. 3. FIG. 2 is illustrative of a partially open position before cover member 18 is folded under. The hinges are not part of the invention, per se, and may be chosen from a variety of suitable, conventional hinge structure available in the marketplace.

Screens 14 and 16 are of the liquid crystal type and as indicated above, will allow simultaneous displays on each screen. Quick-release locks 22 are disposed on both sides of the two screens so that the two screens may be easily locked and detached. Besides providing stability, this arrangement will allow the unit to function as a conventional notebook without total expansion. Screen 16 is provided with a leg 17 which is adjustably nested in the bottom edge of the screen and extends along the bottom edge between the hinges. Leg 17 is fabricated from a rubberized material and provides means for adjusting the height of screen 16 to relieve stress on the hinges. Leg 17 also presents a non-slip support for screen 16.

Cover member 18 is substantially coextensive with screen 16 and is fabricated from a rigid, durable material, preferably metal or plastic, which is suitable to provide a protective barrier for screen 16. A quick release 24 functions to fasten the cover member at the top of screen 16. Small rubber support legs 26 are disposed on the inner face of cover member 18 at the corners thereof, to keep the cover spaced from the screen when the unit is collapsed. Legs 26 also function as non-slip support when the cover is completely folded under (FIG. 1).

Figure 4:
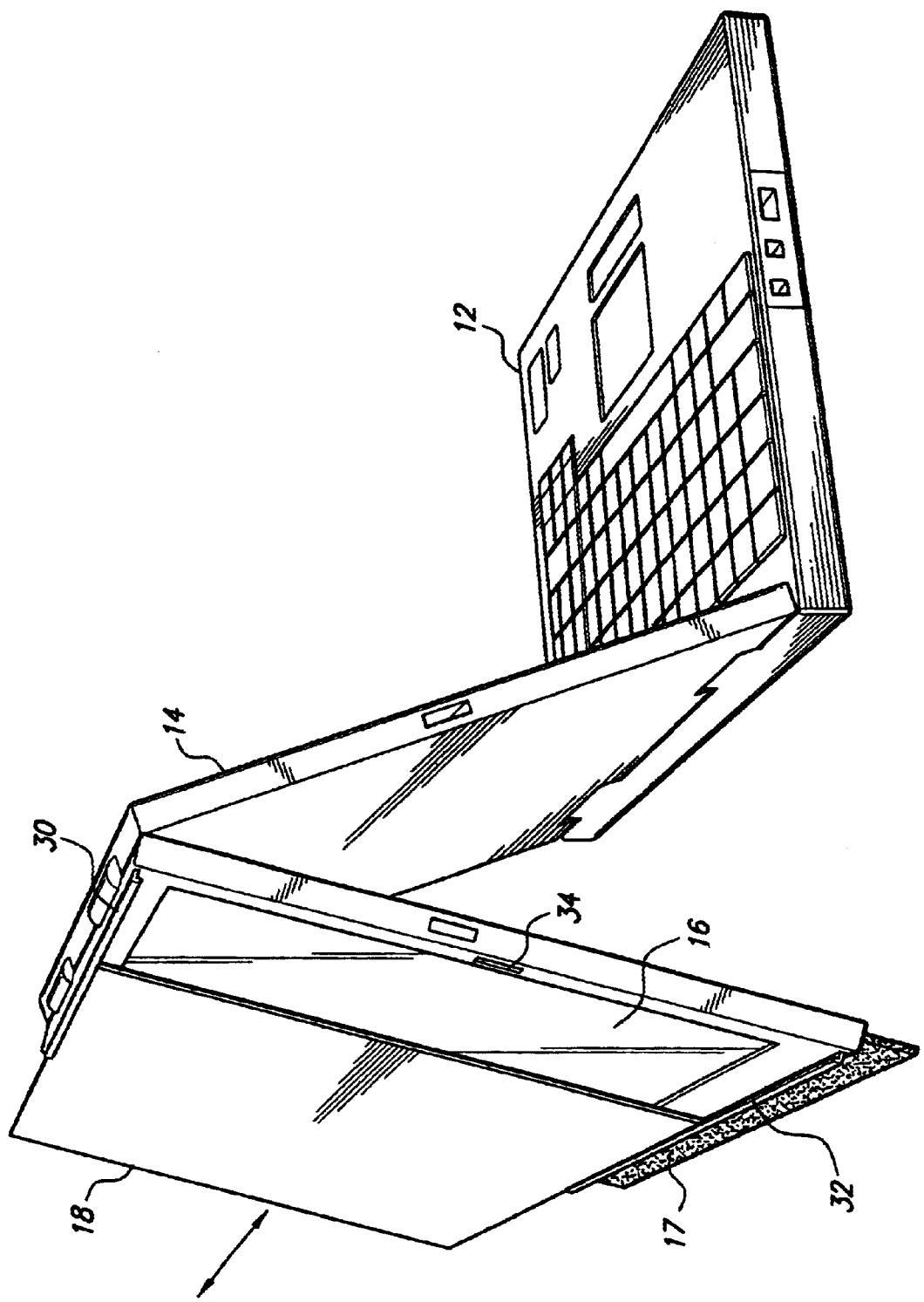
FIG. 4 is a perspective view of a second embodiment of a duel screen notebook computer according to the present invention.

In an alternative embodiment of the invention as illustrated in FIG. 4, cover member 18 is designed to slide over and away from screen 16. This arrangement requires tracks 30 and 32 disposed respectively adjacent the bottom and top of screen 16. Tracks 30,32 extend substantially the entire width of screen 16. Cover member 18 is positioned in the tracks so that it may slide therein to cover or uncover the screen. A conventional quick-release locking mechanism 34 is provided to lock the cover member over the screen.

Figure 5:
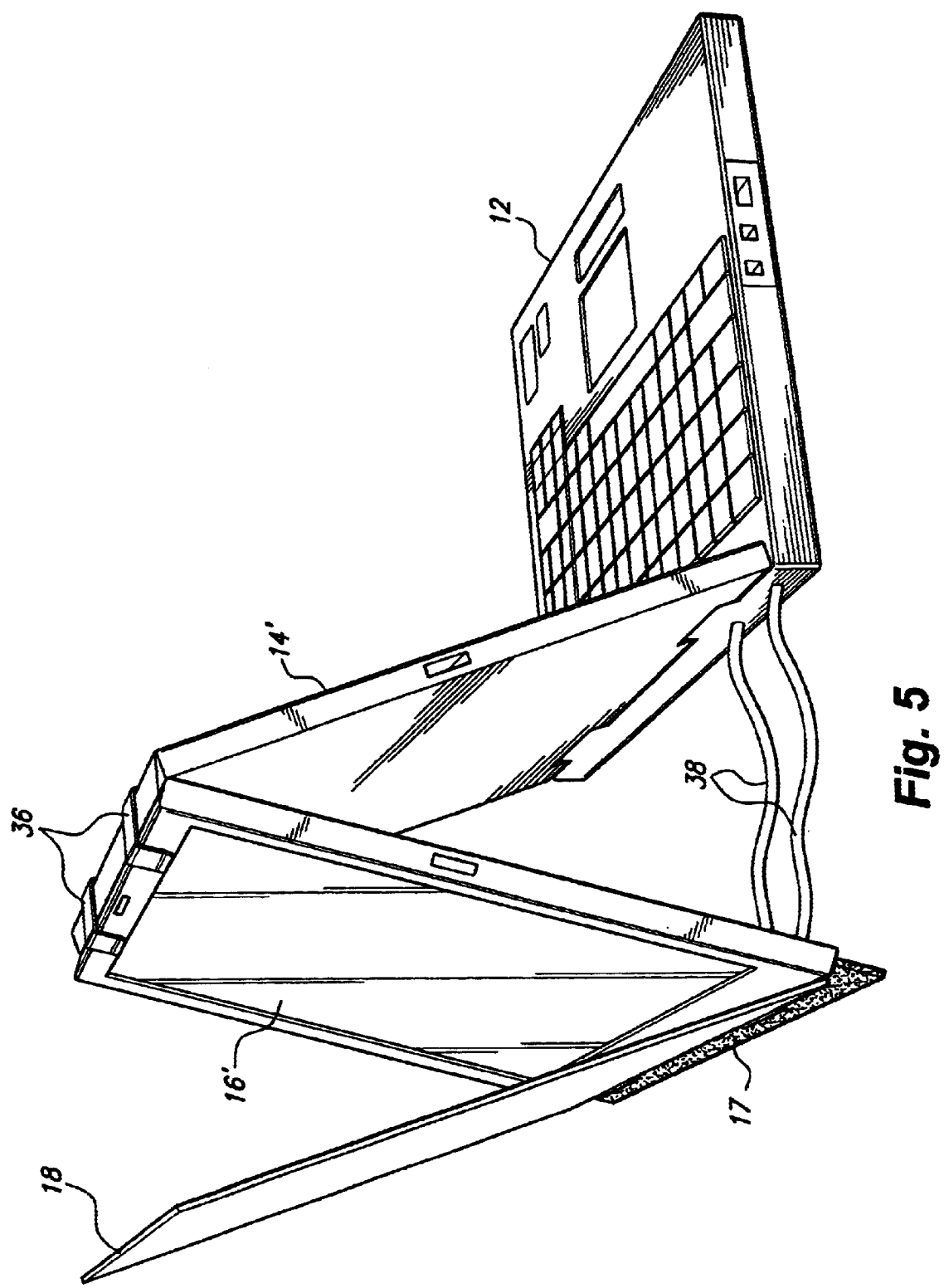
FIG. 5 is a perspective view of a duel screen notebook computer wherein a second screen is adapted to be retrofitted to a standard notebook computer according to the present invention.
Figure 6:
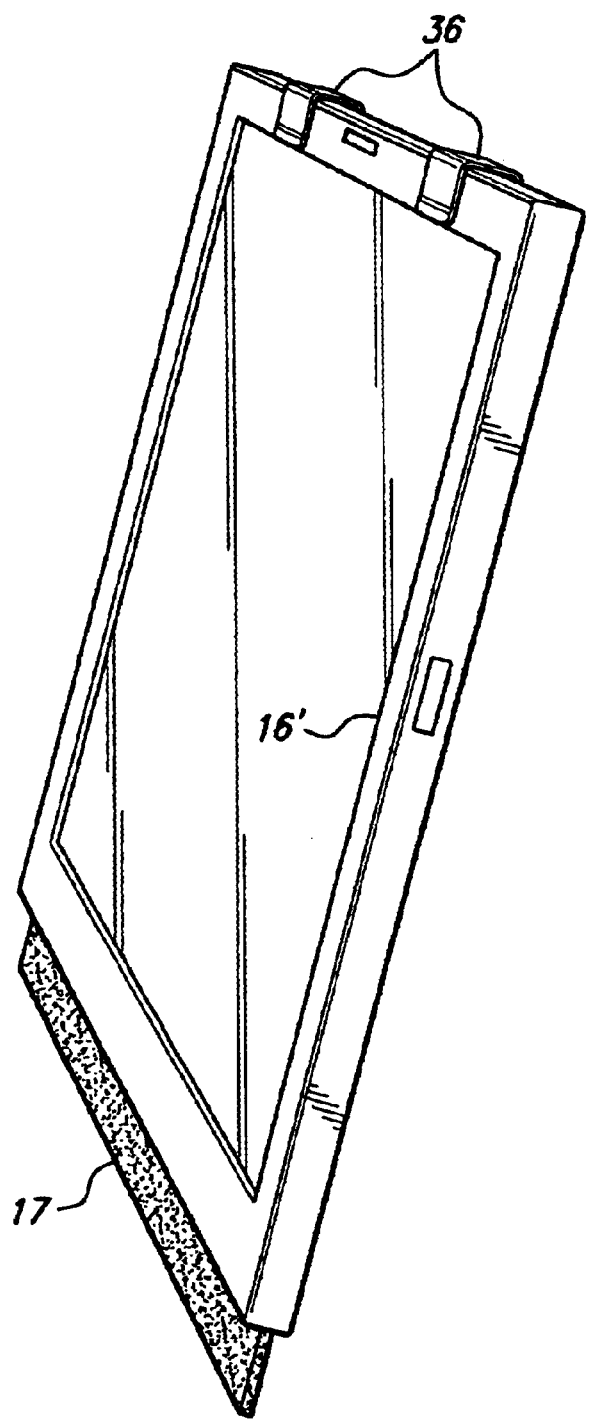
FIG. 6 is a side view of a duel screen notebook computer wherein a second screen is adapted to be retrofitted to a standard notebook computer according to the present invention.

To handle the market of notebooks already in use, a retrofit option is available. As shown in FIGS. 5 and 6, this option enables a user to attach the second screen to the first screen. In lieu of hinges, a pair of snap-over clamps 36 will attach a second screen 16' to a primary screen 14'. Cords 38 are provided to electronically connect screen 16' to the computer keyboard. The second screen will obviously incorporate a hinged or sliding cover and an adjustable leg.

It is to be understood that the present invention is not limited to the embodiments described above, but encompasses any and all embodiments within the scope of the following claims.

I claim:

1. A notebook computer comprising:
    a computer keyboard having a top end;
    a primary screen having a top edge, a bottom edge and a pair of side edges;
    hinges pivotally attaching the bottom edge of said primary screen to the top end of said keyboard;
    a secondary screen having a top edge, a bottom edge and a pair of side edges;
    means for attaching the top edge of said secondary screen to the top edge of said primary screen;
    a flat, rigid member attached to and coextensive with said secondary screen for removably covering said secondary screen, wherein said rigid member has a top edge and a bottom edge and wherein said bottom edge of said rigid member is hinged for pivoting movement to said bottom edge of said secondary screen; and
    quick-release locks for fastening the primary and secondary screens together, said quick-release locks being positioned on the side edges of said primary screen and said secondary screen.

2. The notebook computer as recited in claim 1, wherein said rigid member has an inner face and corners and wherein a plurality of support legs are disposed on said inner face at said corners.

3. The notebook computer as recited in claim 2, including a quick-release lock positioned adjacent the top edge of said secondary screen, whereby said top edge of said rigid member may be locked to said top edge of said secondary screen.

4. A notebook computer comprising:
    a computer keyboard having a top end;
    a primary screen having a top edge, a bottom edge and a pair of side edges;
    hinges pivotally attaching the bottom edge of said primary screen to the top end of said keyboard;
    a secondary screen having a top edge, a bottom edge and a pair of side edges;
    respective tracks positioned adjacent the top edge and the bottom edge of the secondary screen;
    means for attaching the top edge of said secondary screen to the top edge of said primary screen;
    a flat, rigid member attached to and coextensive with said secondary screen for removably covering said secondary screen; and
    quick-release locks for fastening the primary and secondary screens together, said quick-release locks being positioned on the side edges of said primary screen and said secondary screen.

5. The notebook computer as recited in claim 4, wherein said rigid member has a top edge and a bottom edge disposed in said respective tracks for sliding movement therein.

6. The notebook computer as recited in claim 5, including a quick-release lock disposed on one of said pair of side edges of said secondary screen, whereby said rigid cover member may be locked to said one of said pair of side edges.

7. A notebook computer comprising:
    a computer keyboard having a top end;
    a primary screen having a top edge, a bottom edge and a pair of side edges;
    hinges pivotally attaching the bottom edge of said primary screen to the top end of said keyboard;
    a secondary screen having a top edge, a bottom edge and a pair of side edges;
    a plurality of snap over clamps for attaching said top edge of said secondary screen to said top edge, top edge of said primary screen; and
    a flat, rigid member attached to and coextensive with said secondary screen for removably covering said secondary screen, said rigid member having a top edge and a bottom edge and wherein said bottom edge of said rigid member is hinged for pivoting movement to said bottom edge of said secondary screen, wherein said rigid member has an inner face and corners and wherein a plurality of support legs are disposed on said inner face at said corners.

8. The notebook computer as recited in claim 7, including a quick-release lock positioned adjacent the top edge of said secondary screen, whereby said top edge of said rigid member may be locked to said top edge of said secondary screen.

9. A notebook computer comprising:

a computer keyboard having a top end;

a primary screen having a top edge, a bottom edge and a pair of side edges;

hinges pivotally attaching the bottom edge of said primary screen to the top end of said keyboard;

a secondary screen having a top edge, a bottom edge and a pair of side edges;

a plurality of snap over clamps for attaching said top edge of said secondary screen to said top edge top edge of said primary screen;

respective tracks positioned adjacent the top edge and the bottom edge of the secondary screen; and a flat, rigid member attached to and coextensive with said secondary screen for removably covering said secondary screen, wherein said rigid member has a top edge and a bottom edge disposed in said respective tracks for sliding movement therein.

10. The notebook computer as recited in claim 9, including a quick-release lock disposed on one of said pair of side edges of said secondary screen, whereby said rigid cover member may be locked to said one of said pair of side edges.

* * * * *